Figure 1:
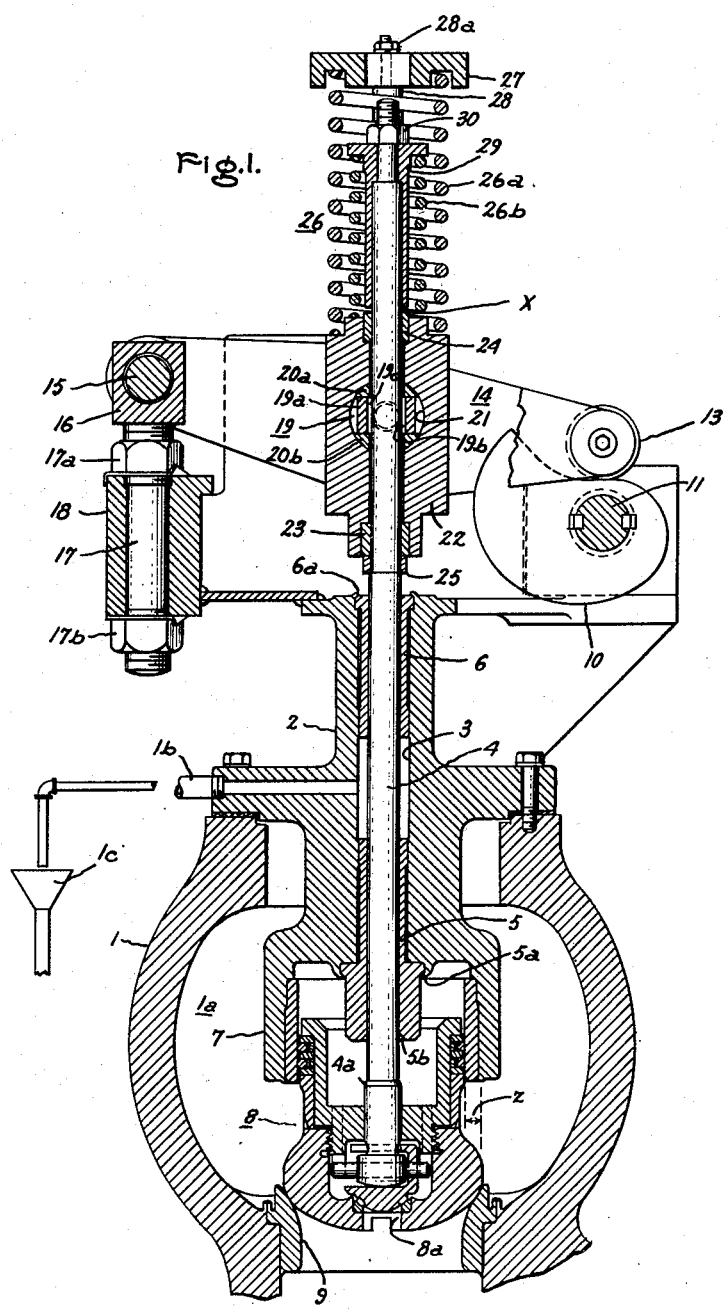

Inventors:
Raymond Sheppard,
Peter G. Ipsen,
by Richard E. Harley
Their Attorney.

Jan. 19, 1954 R. SHEPPARD ET AL 2,666,452
VALVE ACTUATING MECHANISM
Filed Dec. 29, 1951 2 Sheets-Sheet 2
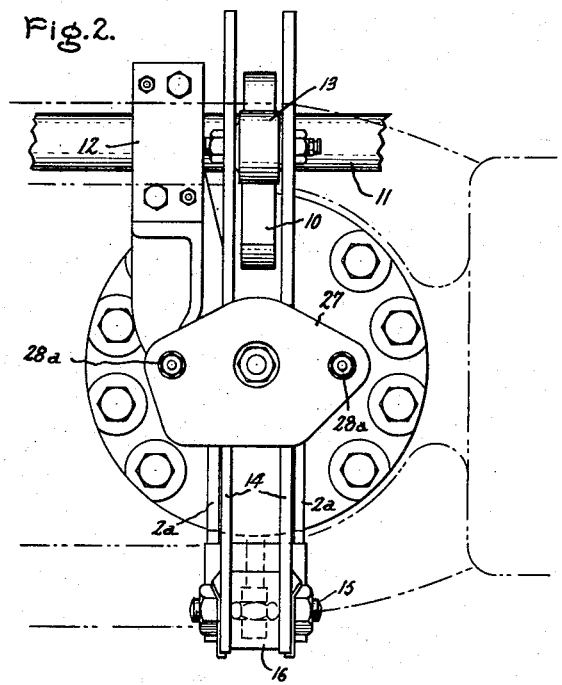
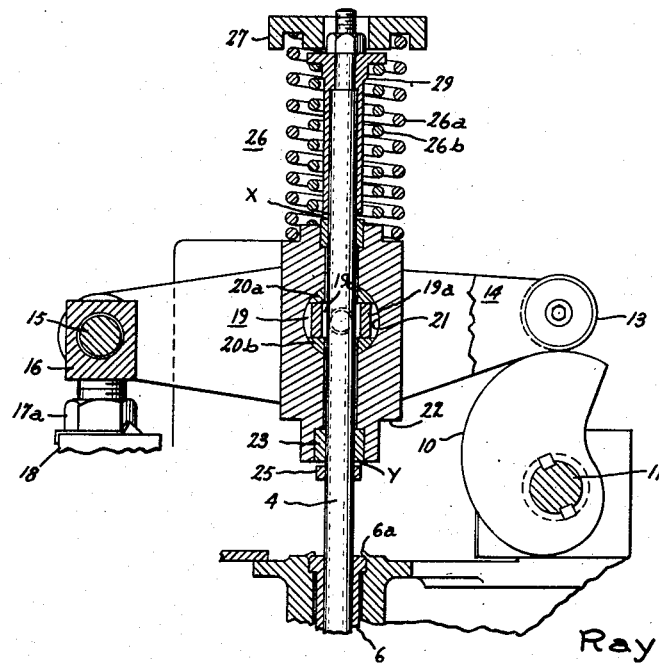
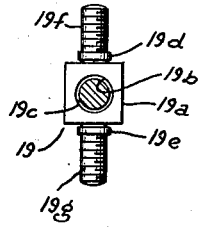
Inventors:
Raymond Sheppard,
Peter G. Ipsen,
by Richard E Harley
Their Attorney.

Patented Jan. 19, 1954

2,666,452

UNITED STATES PATENT OFFICE 2,666,452

VALVE ACTUATING MECHANISM

Raymond Sheppard, Schenectady, and Peter G. Ipsen, Niskayuna, N. Y., assignors to General Electric Company, a corporation of New York Application December 29, 1951, Serial No. 264,176

3 Claims. (Cl. 137—701)

This invention relates to mechanical actuating mechanism particularly adapted for positioning the stem of a steam valve in a prime mover such as an elastic fluid turbine.

The valve described particularly herein is adapted to be employed as an "intercept valve" for stopping the flow of motive fluid from the "reheater" section of a steam generator to the succeeding stages of a reheat type turbine. It will be apparent to those skilled in the art that the valve is also applicable to service as a stop valve in the high pressure inlet conduit of a steam turbine, or, with suitable modifications noted hereinafter, for use as the control or throttle valve of a steam turbine.

As steam temperatures have risen above 700° F., it has been found necessary to abandon the previously used "soft" packings for valve stems and employ "hard" packings consisting of accurately machined bushings fitting the stem with a clearance on the order of perhaps .012", this small clearance being relied upon to reduce leakage along the stem. This led to considerable trouble with valve stems sticking due to deposition in the clearance space between stem and bushing of dirt and boiler compounds carried by the steam. In order to reduce this leakage and prevent sticking troubles, it has previously been proposed to provide the valve stem with an annular sealing shoulder adapted to engage a co-operating seat on the adjacent end of the guide bushing. When in the fully open position, steam pressure forces this stem sealing shoulder against its seat to effectively prevent leakage along the stem. The use of this construction has led to the further difficulty that, when the valve is held in the wide open position, differential thermal expansion between the comparatively massive valve housing and the smaller valve stem may result in excessive stresses being imposed on the stem, even sufficient to break the stem.

Accordingly, one object of the invention is to provide an improved actuating mechanism for a valve having a stem sealing shoulder and incorporating special resilient means to prevent the imposition of excessive stresses on the valve stem due to differential thermal expansion.

A further object is to provide valve actuating mechanism specially adapted for use in connection with multiple valves operated from a common cam-shaft, in which case it is required that extremely precise adjustment be provided in order that the several sealing surfaces associated with the respective stems will properly engage their seats. Different thermal expansions and deflections in the respective valve stem and housing members makes it extremely difficult to insure that the sealing surfaces of all the stems will engage effectively. Accordingly, the present invention provides an improved actuating mechanism incorporating resilient means arranged to insure that uniform sealing will be effected on the respective stem sealing surfaces.

Other objects and advantages will become apparent from the following description taken in connection with the accompanying drawings, in which Fig. 1 is a full sectional view of a steam valve having actuating mechanism incorporating the invention, Fig. 2 is a top view of the valve actuating mechanism shown in Fig. 1, Fig. 3 is a plan view of a detail part of the actuating mechanism, and Fig. 4 is a partial view of the valve actuating mechanism corresponding to the fully open position.

Generally, the invention is practiced by providing a cross-head connected to the valve stem and pivotally engaging a valve actuating lever, with a multiple spring arrangement engaging the cross-head and providing limited resilient travel of the stem relative to the cross-head when the sealing surfaces contact and the actuating cam continues to lift the lever.

Referring now more particularly to Fig. 1, the intercept valve disclosed comprises a housing 1 having a bolted-on head member 2 with a longitudinal bore 3 in which the valve stem 4 is supported by a pair of carefully machined spaced bushings 5, 6. The lower end of head member 2 projects into the steam inlet chamber 1a and defines a cylinder 7 in which is slidably disposed a cooperating cylindrical portion of the steam flow control disk assembly 8. This valve head assembly 8 includes a pilot valve arrangement for opening an auxiliary port 8a in the lower central portion thereof before the stem begins to move the whole disk assembly 8 away from its seat member 9. The details of this valve head assembly are not material to an understanding of the present invention and are therefore not described more particularly.

The upper valve stem guide bushing 6 has a central bore closely fitting the stem, with a clearance of perhaps .012 inch therebetween, and is secured in place in the housing 2, as for instance by peening or rolling the adjacent portion of the housing over the end surface of the bushing 6, as indicated at 6a. Similarly, the lower guide bushing 5 is secured in the housing by the rolled over housing portion 5a. Other means of securing these guide bushings could of course be used.

Attention is particularly directed to the sealing shoulder 4a formed near the lower end of valve stem 4. This shoulder is adapted to engage a conical seat 5b formed on the adjacent end surface of bushing 5. It will be obvious to those skilled in the art how the sealing shoulder 4a engages seat 5b in the "valve open" position to prevent leakage along the stem.

To drain off any leakage which does pass through the clearance between valve stem and lower guide bushing 5, as may occur for short periods during testing of the valves or during overspeeding, a leak-off conduit 1b is provided. To provide optical indication of leakage, when shoulder 4a is seated against bushing 5a the open end of conduit 1b discharges any condensate into an open drain funnel 1c. Thus the operator can instantly see whether there is any substantial amount of steam leakage past the sealing shoulder 4a. This valve is of the so-called "cam-lift" type, in which the stem is positioned by a rotatable cam 10 carried on an actuating shaft 11 journalled in a plurality of suitable bearings, only one of which is shown at 12 in Fig. 2. The contoured circumference of the cam is engaged by a cam follower roller 13 journalled between the spaced parallel plates of a lever member 14. The end of lever 14 remote from cam 10 is carried on a fixed, but adjustable, pivot 15 rotatably carried in a journal block 16 secured to or formed integral with the upper end of a threaded post member 17. Post 17 is slidably disposed in a boss 18 which is suitably welded to the housing 2 and/or the upwardly extending bracket members 2a, which also carry the respective bearings for the cam shaft 11. It will be apparent that the adjustable post 17 can be moved vertically a limited extent by suitable adjustment of the lock nuts 17a, 17b, for a purpose noted hereinafter.

The operating lever 14 is connected to the valve stem 4 by a crosshead member 19, a plan view of which is shown in Fig. 3. It will be apparent that this crosshead has a generally rectangular central portion 19a with a generously proportioned opening 19b through which passes the valve stem 4, with considerable clearance therebetween. This clearance is indicated at 19c in Fig. 1. The oppositely extending trunnion portions comprise journal portions 19d, 19e rotatably received in the lever plates 2a. The extreme end portions 19f, 19g are threaded to receive retaining nuts. The flat upper and lower surfaces of cross-head portion 19a are carefully ground for sliding engagement with a pair of semi-cylindrical hardened and ground thrust blocks shown at 20a, 20b in Fig. 1. It will be apparent that the cross-head 19 is disposed through a large transverse opening 21 in a "floating bushing 22." As shown in Fig. 1, the curved surfaces of the thrust blocks 20a, 20b engage the wall of the circular transverse hole 21, while the flat sides of the thrust blocks engage the flat parallel sides of the cross-head portion 19a. With this arrangement, longitudinal movement of cross-head 19 is transmitted to the floating bushing 22, with a self-aligning action which permits the valve stem 4 to shift laterally somewhat, relative to the crosshead, as permitted by the generous clearance space 19c and the corresponding clearance 20c between stem and thrust blocks. This transverse shifting movement is made necessary by the fact that the lever 14 pivots about the fixed fulcrum 15, so that the cross-head 19 moves in the arc of a circle, while the valve stem 4 is constrained to move in a straight line path by the guide bushings 5, 6. By using hardened and ground cooperating parts for this self-aligning connection, the friction forces introduced are minimized.

The floating bushing 22 is carried in slidable concentric relation with valve stem 4 by a pair of spaced end guide bushings 23, 24. The lowermost position of bushing 22 is determined by engagement of the lower guide bushing 23 with a spacer ring 25 which seats against an annular shoulder on the stem 4. It will be observed that in Fig. 1 the valve is shown in the fully closed position with the flow control member 8 engaging its seat 9 so that stem 4 is in its lowermost position.

The upper end of floating bushing 22 is engaged by a compound spring arrangement indicated generally at 26. This comprises an outer spring 26a having a lower end abutting the upper annular end surface of bushing 22 and an upper end engaging a fixed abutment member 27. The plan view of abutment 27 is shown in Fig. 2, from which it will also be apparent that this abutment is supported from the valve housing by a pair of diametrically spaced posts 28, the upper ends of which have reduced diameter threaded portions receiving nuts 28a. It will be seen that spring 26a exerts a downward biasing force on the floating bushing 22. The function of this spring is to maintain the cam follower roller 13 in engagement with the actuating cam 10 in spite of the effect of unbalanced steam pressure forces on the valve stem and flow control member 8. Spring 26a also tends to overcome any tendency of the valve to stick in the guide bushings 5, 6, and overcomes the weight of the moving parts when the valve is installed in inverted position. Coaxially disposed within the downward biasing spring 26a is a smaller spring 26b, the lower end of which also engages the upper end surface of floating bushing 22. The upper end of spring 26b engages a radially extending flange on the end of a bushing 29 which is fixed to the upper end of valve stem 4 by a retaining nut 30, which holds bushing 29 against a circumferential shoulder on the valve stem. Spring 26b is designed to be sufficiently stiff that it will transmit from the floating bushing 22 to the abutment bushing 29 all forces normally incident to the positioning of the valve stem, without substantial compression of this spring. It is to be noted that, in the "valve closed" condition shown in Fig. 1, there is a substantial clearance space, identified X, between the abutment bushing 29 and the upper guide bushing 24.

Having described the structure, the method of operation of this valve actuating mechanism is as follows:

As indicated above, in the "closed" condition stem 4 is in its extreme lowermost position and floating bushing 22 is in engagement with the lower stop member 25, there being a substantial clearance space at X between the upper end of bushing 22 and the abutment bushing 29. The coil spring 26a will hold the valve in this position regardless of whether there is steam pressure in the chamber 1a; and spring 26a is sufficient to effect this even when the valve is mounted in upside down position, so that spring 26a has to support the weight of the moving parts. When there is steam pressure in chamber 1a, there is an additional downward biasing force due to steam pressure acting on the annular area indicated at Z in Fig. 1.

If now it is desired to open the valve, the actuating shaft 11 is rotated by suitable motor means (not shown) so that cam 10 positions lever 14 counterclockwise about its fixed fulcrum 15, cross-head 19 forcing the floating bushing 22 upwardly. Because of the downward force on valve head member 8 due to the steam pressure acting on annular area Z, the force required to "crack" the valve is sufficient to compress spring 26b (as well as spring 26a) so that the clearance space X closes up and bushing 24 positively engages the end of abutment bushing 29. Further movement of lever 14 will therefore positively move stem 4 upwardly. As cam 10 continues to rotate, the valve disk 8 rises and the pressure drop thereacross begins to decrease. Eventually, the differential pressure forces acting on the annular area Z of valve disk 8 are insufficient to hold the stem downward against the bias of spring 26b, with the result that the spring forces bushing 29 upwardly so as to open the clearance space X, and close the clearance space at Y. As indicated above, the spring 26b is sufficiently stiff to transmit the force required to position the valve stem in the opening direction, except when the valve is first cracked.

Continued rotation of cam 10 will move the valve disk to the fully open position, determined by engagement of the sealing shoulder 4a with the conical seat 5b. The cam 10 is so contoured that, after the stem reaches this fully open position, there is a certain amount of cam travel left, which further travel causes the floating bushing 22 to be elevated a slight increment so as to compress spring 26b and again open a small clearance space at Y. This condition is shown in Fig. 4. It will now be seen that vertical adjustment of the fixed pivot 15 will enable the operator to adjust the size of clearance X relative to clearance Y for a given contour of the cam 10. Ordinarily the adjustable fulcrum 15 will be so set that the clearances X and Y will be of equal magnitude when the valve is in fully open condition.

This means that, when fully opened, the bushing 22 "floats" freely between the valve stem abutments 25, 29. With this arrangement any differential thermal expansion which may occur between valve stem 4 and the valve housing will be accompanied by certain longitudinal adjustment of bushing 22 relative to the stem 4 without imposing excessive stresses on the valve stem. A further important function is that after one valve stem has engaged its seat, further rotation of the cam will cause the sealing shoulders of the other stems operated from the same cam-shaft to seat tightly. Thus all the sealing shoulders are forced against their cooperating seats with substantially the same sealing force.

It may also be noted that, in the wide open position, the steam pressure in chamber 1a acts upwardly on the area of stem 4 in Fig. 1; and the downward biasing force of the springs 26a, 26b is sufficient to hold cross-head 22 down, with cam follower roller 13 maintained in engagement with cam 10, in spite of this upward biasing force of the steam pressure.

Thus it will be seen that the invention provides an improved shut-off or control valve for elastic fluid turbines which is simple and rugged, having an effective stem sealing arrangement, and means for insuring uniform sealing pressure on a number of stem seals when a number of such valves are actuated by a common cam shaft and operating servo-motor.

While only one modification has been described specifically herein, it will be apparent to those skilled in the art that numerous modifications might be made without departing from the spirit of the invention. For instance, where the valve is intended to be positioned accurately for controlling the flow of motive fluid to a turbine, as distinguished from a shut-off valve which is always in either fully open or fully closed position, it is necessary to make the spring 26b sufficiently strong that it can move the valve stem from the fully closed position against the full force of the steam inlet pressure acting on the annular area Z, with no compression of the spring. The same result may be obtained by decreasing the area Z, thereby reducing the force required to lift the valve. Otherwise, the operation of the valve would be as described above for a shut-off type of valve. It will also be appreciated that equivalent mechanical expedients may be used for adjusting the fixed fulcrum 15 of the actuating lever 14, and that the self-aligning connection between the bushing 22 and the valve stem may take many forms. It is, of course, intended to cover by the appended claims all such modifications as fall within the true spirit and scope of the invention.

What we claim as new and desire to secure by Letters Patent of the United States is:

1. Actuating mechanism for a stem member disposed for longitudinal sliding movement relative to a housing member comprising first and second spaced fixed abutment means defining the respective ends of the range of movement of the stem, a floating bushing member with an axial hole therethrough in which the stem member is slidably disposed and a transverse opening extending through the bushing normal to said axial hole, third and fourth abutment means on the stem at either side of the bushing and spaced apart a distance greater than the axial length of the bushing whereby the third and fourth abutments may define clearance spaces with either or both ends of the bushing, means for positively positioning said bushing longitudinally relative to the stem comprising a cross-head member disposed in said transverse opening, the central portion of the cross-head having an opening therethrough in which the stem is disposed with substantial clearance between stem and cross-head, the respective projecting ends of the cross-head being journaled in an actuating lever having one end supported on a fulcrum fixed relative to the housing, means for positioning the lever to cause the cross-head to move the floating bushing longitudinally, fifth fixed abutment means spaced axially from the end of the floating bushing, a first coil spring disposed coaxially around the stem with one end engaging said fifth abutment and the other end engaging the adjacent end of the floating bushing, and a second coil spring coaxially disposed within the first spring with one end engaging the floating bushing and the other end engaging said fourth abutment on the stem, whereby movement of the floating bushing in one direction by the actuating lever transmits force to the stem through said second coil spring until further movement of the stem is prevented by said second abutment means, whereupon further movement of the actuating lever moves the floating bushing to compress said second spring until a clearance space is defined between the respective ends of the bushing and said third and fourth abutments.

2. Actuating mechanism in accordance with claim 1 and including means for adjustably positioning the fixed fulcrum of the actuating lever in a direction substantially parallel to the stem to adjust the relative sizes of the clearance spaces defined between the third and fourth abutments and the respective ends of the floating bushing when the actuating lever member is at the end of its normal range of movement.

3. Actuating mechanism for a pressure fluid control valve having a valve stem member disposed for longitudinal sliding movement relative to a valve housing and a fluid flow control disk member adapted to engage an annular seat member with fluid pressure biasing the disk member against the seat, the valve stem having an annular sealing shoulder adapted to engage a cooperating fixed seat member to prevent leakage of fluid along the stem when the valve is in open position, the actuating mechanism comprising a floating bushing member with an axial hole therethrough in which the stem is slidably disposed and a transverse opening extending through the bushing normal to said axial hole, first and second abutment means carried on the stem at either side of the bushing and spaced apart thereon a distance greater than the axial length of the bushing whereby said abutments may define clearance spaces with either or both ends of the bushing, means for positively positioning said bushing longitudinally relative to the stem comprising a cross-head member disposed in said transverse opening, the central portion of the cross-head defining an opening through which the stem is slidably disposed with substantial clearance space therebetween, the respective projecting ends of the cross-head defining journals pivotally engaging an actuating lever member, a fixed fulcrum pivotally supporting one end of said lever, means for positioning the other end of the lever to cause the cross-head to move the floating bushing longitudinally relative to the valve stem, third fixed abutment means spaced axially from the end of the floating bushing, a first coil spring disposed coaxially around the stem with one end engaging said third abutment and the other end engaging the adjacent end of the floating bushing, and a second coil spring coaxially disposed within the first spring with one end engaging the floating bushing and the other end engaging said second abutment on the valve stem, whereby movement of the floating bushing in the valve opening direction by the actuating lever effects the transmission of force to the valve stem through said second coil spring until the stem sealing shoulder engages its stationary seat, whereupon further movement of the actuating lever moves the floating bushing to compress said second spring until a clearance space is defined between each end of the bushing and said first and second abutments respectively.

RAYMOND SHEPPARD.
PETER G. IPSEN.

References Cited in the file of this patent

UNITED STATES PATENTS

| Number | Name | Date |
| --- | --- | --- |
| 1,005,713 | Killin | Oct. 10, 1911 |
| 2,007,569 | Hoke | July 9, 1935 |
| 2,067,612 | Loeffler | Jan. 12, 1937 |
| 2,104,502 | Allen | Jan. 4, 1938 |